United States Patent [19]
Martinsson

[11] Patent Number: 6,003,829
[45] Date of Patent: Dec. 21, 1999

[54] DEVICE FOR SUSPENSION OF A MEMBER SUCH AS A CARBURETOR OF AN INTERNAL COMBUSTION ENGINE

[75] Inventor: Pär Martinsson, Jönköping, Sweden

[73] Assignee: Aktiebolaget Electrolux, Stockholm, Sweden

[21] Appl. No.: 08/984,474

[22] Filed: Dec. 3, 1997

[30] Foreign Application Priority Data

Dec. 5, 1996 [SE] Sweden ................................ 9604489

[51] Int. Cl.⁶ .................................................. F16M 1/00
[52] U.S. Cl. .......................... 248/675; 248/637; 248/638
[58] Field of Search ................................... 248/674, 675, 248/637, 638; 267/140.11, 140.13, 153, 292

[56] References Cited

U.S. PATENT DOCUMENTS

| | | |
|---|---|---|
| 4,420,060 | 12/1983 | Kakimoto ................................ 180/300 |
| 4,848,756 | 7/1989 | Funahashi et al. ................... 267/140.1 |
| 5,102,107 | 4/1992 | Simon et al. ............................ 267/152 |
| 5,601,304 | 2/1997 | Tilly et al. ............................... 280/673 |
| 5,810,322 | 9/1998 | Zhao et al. .............................. 248/675 |

Primary Examiner—Derek J. Berger
Assistant Examiner—Dave Heisey
Attorney, Agent, or Firm—Pearne, Gordon, McCoy & Granger LLP

[57] ABSTRACT

A device for suspension of a member (10), such as a carburetor, which forms part of a fuel system of an internal combustion engine which is provided in a housing (11). The device includes at least one resilient element (13) attached to the housing and connected to the member (10) in order to allow a certain range of movement thereof relative to the housing. The resilient element (13) is adapted to cooperate with a supporting structure (13d, 14) serving to restrict the range of movement of the member (10).

16 Claims, 1 Drawing Sheet

DEVICE FOR SUSPENSION OF A MEMBER SUCH AS A CARBURETOR OF AN INTERNAL COMBUSTION ENGINE

BACKGROUND OF THE INVENTION

The present invention generally relates to a suspension device for a member, such as a carburetor, which forms part of a fuel system of an internal combustion engine and is provided in a housing. More specifically, the present invention relates to a suspension device having at least one resilient element attached to the housing and connected to the member in order to allow a certain range of movement of the member relative to the housing.

In working tools, such as motor saws powered by an internal combustion engine having a fuel system comprising a carburetor, it is preferable to have the fuel system arranged so as minimize the effects of engine vibration. Reduction in transmission of engine vibrations to the carburetor is desirable because such engine vibrations can affect the adjustment of the fuel system and may cause the carburetor parts to frictionally wear, which could lead to an unsatisfactory operation of the fuel system.

To this end, it is previously known in engines provided with a carburetor to connect the carburetor to the engine by means of a resilient intake tube and, in addition, to provide a resilient suspension for the carburetor in the housing. Such a resilient suspension can be provided by resilient elements, normally made of rubber. Such resilient elements make it possible to achieve an efficient vibration isolation of the carburetor. However, it has been found that elements resilient enough to provide satisfactory vibration isolation cause too much movement of the carburetor. Accordingly, there exists a need in the art for a resilient carburetor suspension which effectively dampens vibration while preventing excessive carburetor movement.

SUMMARY OF THE INVENTION

The present invention is directed toward a device for suspension of a member of a fuel system that insures satisfactory vibration isolation while limiting amplitude of movement of the member.

In accordance with the present invention, the suspension device includes at least one resilient element attached to the housing and connected to the member. The resilient element is adapted to permit a certain range of movement of the member relative to the housing, and thereby efficiently limits communication of engine vibration to the member. The device also includes a support that is operable to limit the extent of movement of the member.

In further accordance with the present invention, the support includes a stationary supporting wall which serves to limit movement of the member in at least one direction. The resilient element includes a hollow cylinder which is attached to the housing at one side and, at a diametrically opposite side, provides an attachment to which the member is secured. The hollow cylinder has an internal support which is operable to restrict movement.

In further accordance with the present invention, the internal support extends from one side of the hollow cylinder toward the opposite side thereof. The internal support extends across at least a part of the hollow interior of the cylinder. A terminal end of the internal support is spaced a short distance from the opposite side of the hollow cylinder.

In further accordance with the present invention, the member is supported by a bracket. The bracket includes levers which extend in opposite directions. Each outer end of the levers is connected to a resilient element. The lever outer ends include pins which are releasably received in openings in the resilient element.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 2:
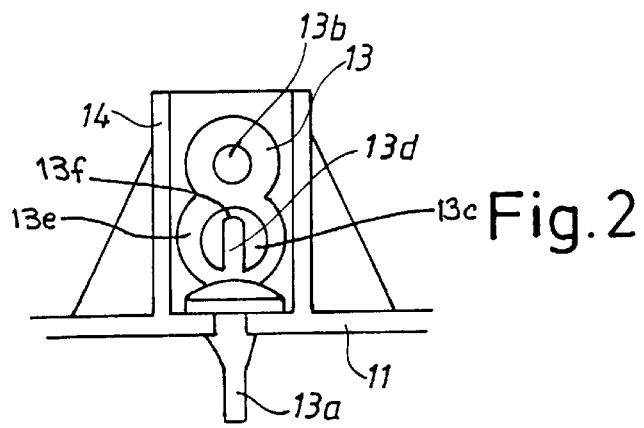

With reference to the drawings, a portion of a carburetor 10, which is disposed within an engine housing 11, is shown. The carburetor 10 is attached to a bracket 12 comprising two levers 12a, 12b and also supporting an air filter (not shown). Outer ends of the levers 12a, 12b are supported by resilient rubber elements 13 that are, in turn, attached to the housing 11. As shown best in FIG. 2, the rubber element 13 is attached to the housing 11 by a pin 13a which is inserted into a complementary opening in the housing 11.

A top portion of the element 13 has an opening 13b for receiving a corresponding pin 12c projecting from the outer end of the associated lever 12a, 12b. The ends of the levers 12a, 12b are thereby releasably connected to the rubber elements 13, which facilitates mounting and removal of the carburetor.

A bottom portion 13e of the element 13 is shaped as a tube having a circular opening 13c. The pin 13a projects downwardly from the tube-shaped bottom portion 13e. A vertical pin 13d extends upwardly from the bottom inner surface of the tube-shaped bottom portion 13e and across a major part of the diameter of the opening 13c. The pin 13d has its upper end 13f spaced a short distance from the upper inner surface of the tube-shaped bottom portion 13e, as illustrated. Alternatively, the pin 13d can be connected to the upper inner surface of the tube-shaped bottom portion 13e and extend downwardly therefrom toward the bottom inner surface.

Due to the fact that the rubber elements 13 are provided at the ends of the levers 12a, 12b and are, thus, spaced apart a relatively long distance, a relatively stable suspension of the carburetor 10 is obtained.

Figure 1:
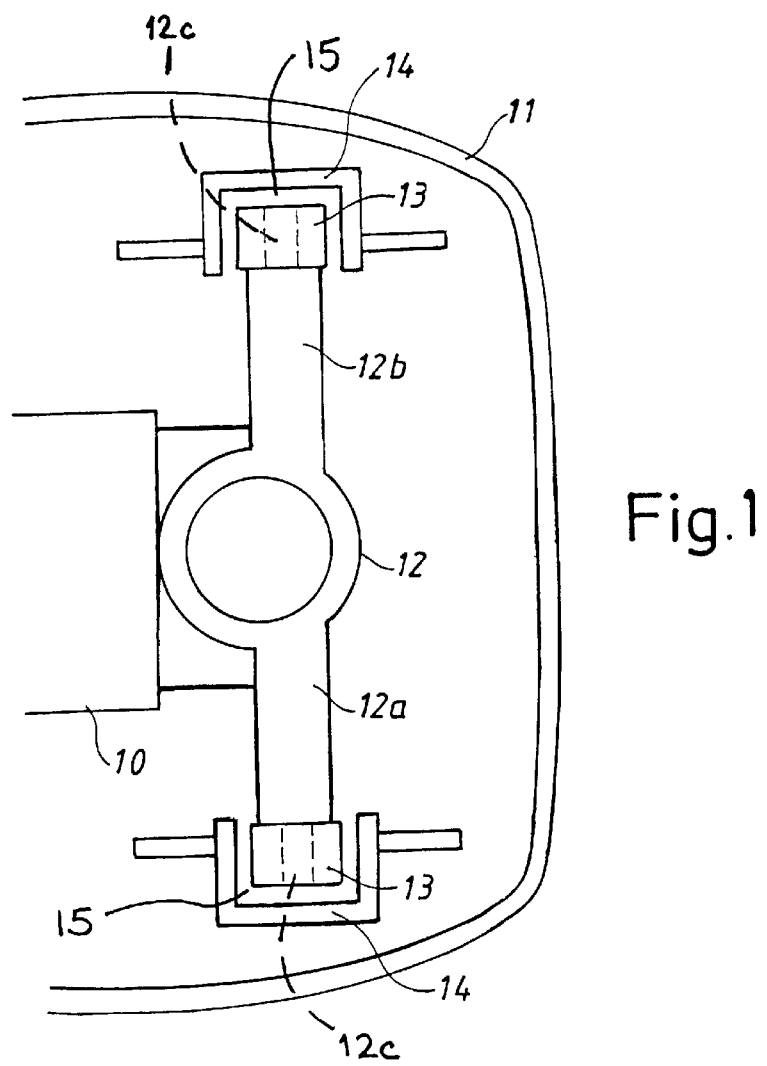
FIG. 1 is schematic plan view of a carburetor provided with a device according to the present invention; and, FIG. 2 is a side view of the device as seen along line II—II of FIG. 1, with a lever (12b) omitted.

The rubber elements 13 are surrounded on three sides by a box-shaped supporting means 14. As shown best in FIG. 1, the supporting means 14 is spaced from the element 13 so as to form a suitable gap or space 15 therebetween. The gap 15 defines the limits of movement of the carburetor 10 in a horizontal plane and, within these limits, the carburetor 10 is thus movable with adequate resilient characteristics provided by the rubber elements 13. Vertical movement of the carburetor 10 is restricted in a corresponding manner by the spacing between the upper end 13f of the pin 13d and the upper inner surface of the bottom portion 13e of the element 13.

The device according to the present invention thus resiliently supports the carburetor 10 and, in addition, insures that the resilient movements will not exceed predetermined limits. It is considered apparent that the present invention described hereinbefore is capable of numerous modifications, additions, and replacements of parts without departing from the scope of the invention as defined by the claims appended hereto.

What is claimed is:

1. Suspension device for a member (10), said member forming part of a fuel system for an internal combustion engine, said member being disposed in said housing (11), said device comprising at least one resilient element (13) adapted to be attached to the housing and connected to said member (10), said at least one resilient element being adapted to permit a certain range of movement of said member relative to said housing, said resilient element comprising a hollow cylinder that is adapted to be attached to the housing at one side of said yellow cylinder, said hollow cylinder having an internal support (13d) that is operable to restrict movement, said internal support extending across at least a part of the inner diameter of the hollow cylinder, wherein said device comprises a support, said support (13d, 14) comprising a stationary supporting wall (14) that serves to limit movement of said member (10) in at least one direction.

2. Device according to claim 1, wherein the supporting wall (14) is spaced a distance from said resilient element and surrounds the resilient element (13) on at least two sides thereof.

3. Device according to claim 1, wherein the resilient element (13), at a side diametrically opposed to said one side, comprises an attachment (13b) to which the member (10) is secured.

4. Device according to claim 3, wherein said internal support extends from said one side toward said opposite side.

5. Device according to claim 1, wherein said device comprises a pair of said resilient elements, the member (10) is adapted to be supported by a bracket (12), said bracket comprising levers (12a, 12b) which extend in opposite directions, each of said levers having an outer end, each of said outer ends being connected to one of the resilient elements (13).

6. Device according to claim 5, wherein said lever outer ends include pins (12c) which are releasably received in openings (13b) in the resilient element (13).

7. A suspension device for a member (10) that forms part of a fuel system for an internal combustion engine, said member being disposed in said housing (11), said device comprising at least one resilient element (13) and a support (13d, 14), said resilient element adapted to be movable relative to said support and said housing and adapted to be connected to said member and thereby permitting said member to have a range of movement relative to said support and said housing, said resilient element comprising a hollow cylinder that is adapted to be attached to said housing at one side, said hollow cylinder comprising an internal support (13d) that is operable to restrict movement, said internal support extending across at least a part of the inner diameter of the hollow cylinder, said support including a stationary supporting wall (14) that is spaced a distance from said resilient element, said supporting wall serving to limit a range of movement of said resilient element and said member in at least one direction.

8. Device according to claim 7, wherein the supporting wall (14) surrounds the resilient element (13) on at least two sides thereof.

9. Device according to claim 7, wherein the resilient element (13), at a side diametrically opposed to said one side, comprises an attachment (13b) to which the member (10) is secured.

10. Device according to claim 9, wherein said internal support extends from said one side toward said opposite side.

11. Device according to claim 7, wherein the device comprises a pair of resilient elements, the member (10) is adapted to be supported by a bracket (12), said bracket comprising levers (12a, 12b) which extend in opposite directions, each of said levers having an outer end, each of said outer ends being connected to one of the resilient elements (13).

12. Device according to claim 11, wherein said lever outer ends include pins (12c) which are releasably received in openings (13b) in the resilient elements (13).

13. Device according to claim 11, wherein said lever outer ends include pins (12c) which are releasably received in openings (13b) in the upper tube shaped portion of the resilient elements (13).

14. Device according to claim 7, wherein the resilient element (13) comprises an upper tube shaped portion, a lower tube shaped portion, and a pin, said pin being attached to said housing.

15. Device according to claim 14, wherein the lower tube shaped portion has an internal support (13d) which is operable to restrict movement, said internal support extending from one interior side of said lower tube shaped portion toward said upper tube shaped portion.

16. Device according to claim 15, wherein the device comprises a pair of resilient elements, the member (10) is adapted to be supported by a bracket (12), said bracket comprising levers (12a, 12b) which extend in opposite directions, each of said levers having an outer end, each of said outer ends being connected to the upper tube shaped portion of each of the resilient elements (13).

* * * * *

UNITED STATES PATENT AND TRADEMARK OFFICE
CERTIFICATE OF CORRECTION

PATENT NO. : 6,003,829
DATED : December 21, 1999
INVENTOR(S) : Martinsson

It is certified that error appears in the above-indentified patent and that said Letters Patent is hereby corrected as shown below:

Column 2, Line 10, after "is" insert --a--.

Column 3, Line 13, Claim 1, delete "yellow" and insert --hollow--.

Column 3, Line 28, Claim 3, after "is" insert --adapted to be--.

Column 4, Line 15, Claim 9, after "is" insert --adapted to be--.

Signed and Sealed this

Twenty-fifth Day of July, 2000

Q. TODD DICKINSON

Attest:

Attesting Officer

Director of Patents and Trademarks